United States Patent [19]

Statz et al.

[11] Patent Number: 5,756,197
[45] Date of Patent: *May 26, 1998

[54] METAL-PIGMENTED COMPOSITE MEDIA WITH SELECTABLE RADIATION-TRANSMISSION PROPERTIES AND METHODS FOR THEIR MANUFACTURE

[75] Inventors: Hermann Statz, Wayland, Mass.; Manfred R. Kuehnle, Waldersruh P.O. Box 1020, Rte. 103A, New London, N.H. 03257

[73] Assignee: Manfred R. Kuehnle, New London, N.H.

[*] Notice: The term of this patent shall not extend beyond the expiration date of Pat. No. 5,534,056.

[21] Appl. No.: 321,405

[22] Filed: Oct. 12, 1994

[51] Int. Cl.$^6$ .................................................. B32B 5/16
[52] U.S. Cl. .................. 428/323; 428/328; 428/332; 428/458; 428/461; 428/498
[58] Field of Search .......................... 428/323, 328, 428/332, 458, 461, 698

[56] References Cited

U.S. PATENT DOCUMENTS

| | | | |
|---|---|---|---|
| 2,977,477 | 3/1961 | Rosi et al. | 250/83 |
| 4,652,755 | 3/1987 | Solomon et al. | 250/341 |
| 4,820,016 | 4/1989 | Cohen et al. | 350/96.29 |
| 4,944,936 | 7/1990 | Lawhorne | 423/612 |
| 5,008,143 | 4/1991 | Armanini | 428/207 |
| 5,037,476 | 8/1991 | Degani et al. | 106/437 |
| 5,106,437 | 4/1992 | Lau et al. | 156/51 |
| 5,152,229 | 10/1992 | Nimmo | 106/420 |
| 5,190,583 | 3/1993 | Menzel et al. | 106/241 |
| 5,232,970 | 8/1993 | Solc et al. | 524/404 |
| 5,238,607 | 8/1993 | Herron et al. | 252/518 |
| 5,238,975 | 8/1993 | Johnson et al. | 523/137 |
| 5,256,191 | 10/1993 | Thompson et al. | 106/19 A |
| 5,280,169 | 1/1994 | Honey et al. | 250/216 |
| 5,318,628 | 6/1994 | Matijevic et al. | 106/499 |
| 5,389,434 | 2/1995 | Chamberlain et al. | 428/323 |
| 5,527,386 | 6/1996 | Statz | 106/481 |
| 5,534,056 | 7/1996 | Kuehnle et al. | 106/455 |

FOREIGN PATENT DOCUMENTS

| | | |
|---|---|---|
| 0230303 | 7/1987 | European Pat. Off. . |
| 2033418 | 5/1980 | United Kingdom . |
| 2104528 | 3/1983 | United Kingdom . |

OTHER PUBLICATIONS

Abstract of Japanese Patent No. JP2173622, Jul. 1990.
Abstract of Japanese Patent No. JP59223754, Dec. 1984.
Abstract of Japanese No. JP54083955, Jul. 1979.

Primary Examiner—H. Thi Le
Attorney, Agent, or Firm—Cesari and McKenna, LLP

[57] ABSTRACT

Composite materials that can be used to block radiation of a selected wavelength range or provide highly pure colors are disclosed. The materials include dispersions of metal particles that exhibit optical resonance behavior, presenting to the selected radiation absorption cross-sections that substantially exceed the particles' geometric cross-sections. The particles are preferably manufactured as uniform nanosize spheres, and dispersed evenly within a carrier material having compatible dielectric characteristics. The large absorption cross-sections ensure that a relatively small volume of particles will render the composite material fully opaque (or nearly so) to incident radiation of the resonance wavelength, blocking harmful radiation or producing highly pure colors. The durability of the particles themselves ensure resistance to mechanical wear forces and the bleaching effects of intense radiation (e.g., sunlight).

11 Claims, 9 Drawing Sheets

METAL-PIGMENTED COMPOSITE MEDIA WITH SELECTABLE RADIATION-TRANSMISSION PROPERTIES AND METHODS FOR THEIR MANUFACTURE

BACKGROUND OF THE INVENTION

1. Field of the Invention

The present invention relates to the selective absorption of electromagnetic radiation by small particles, and more particularly to solid and liquid composite materials that absorb strongly within a chosen, predetermined portion of the electromagnetic spectrum while remaining substantially transparent outside this region.

2. Description of the Related Art

Transparent and translucent materials such as glass, plastic, gels, and viscous lotions have for many years been combined with coloring agents to alter their optical transmission properties. Agents such as dyes and pigments absorb radiation within a characteristic spectral region and confer this property on materials in which they are dissolved or dispersed. Selection of the proper absorptive agent facilitates production of a composite material that blocks transmission of undesirable light frequencies.

Beer bottles, for example, contain additives that impart a green or brown color to protect their contents from decomposition. These include iron (II) and iron (III) oxides in the case of glass bottles, while any of a variety of dyes can be employed in plastic containers. The concentration of these additives (in weight percent relative to the surrounding carrier material) is generally very heavy, in the range of 1–5%, resulting in high expense, difficult dispersion within the carrier, and the need to employ special mixing techniques to counter strong agglomeration tendencies.

Applied colorants such as paints and inks are used to impart a desired appearance to various media, and are prepared by dissolving or dispersing pigments or dyes in a suitable carrier. These materials also tend to require high pigment or dye concentrations, and are vulnerable to degradation from prolonged exposure to intense radiation, such as sunlight. The limited absorption and nonuniform particle morphology of conventional pigments tends to limit color purity even in the absence of degradation.

Most commercially useful coloring agents absorb across a range of frequencies; their spectra typically feature steady decrease from a peak wavelength of maximum absorption, or $\lambda_{max}$. When mixed into a host carrier, such materials tend to produce fairly dark composite media with limited overall transmission properties, since the absorption cannot be "tuned" precisely to the undesirable frequencies. If used as a container, for example, such media provides relatively poor visibility of the contents to an observer.

Traditional means of forming particles that may serve as coloring agents include chemical precipitation and mechanical production (e.g., so-called atomizing) processes. These processes frequently fail to reliably maintain uniform particle size due to agglomeration, and cause sedimentation during and/or after the particles are generated. The problem of agglomeration becomes particularly acute at very small particle diameters, where the ratio of surface area to volume becomes very large and adhesion forces favor agglomeration as a mechanism of energy reduction.

While suitable for conventional uses, in which radiation absorption is imprecise and largely unrelated to particle size or morphology, non-uniform particles cannot be employed in more sophisticated applications where size has a direct impact on performance.

In our copending application Ser. No. 08/144,249 the entire disclosure of which is hereby incorporated by reference, we demonstrated the feasibility of exploiting certain radiation-absorption properties of select semiconductor materials to produce highly advantageous optical properties in uniform, spherical, nanosize particles. These particles, we showed, may be used as optical transmission-reflection "control agents" for a variety of products that require sharp transitions between regions of high and low absorption, i.e., where the material is largely transparent and where it is largely opaque. A key physical feature of many suitable nanosize spherical particles is "optical resonance", which causes radiation of a characteristic wavelength to interact with the particles so as to produce self-reinforcing internal reflections that strongly enhance the amplitude of the radiation trapped within the particle. Conventional pigments offer absorption cross-sections that can only asymptotically approach, but never exceed, a value of 1, whereas resonant particles can exhibit cross-sections well in excess (e.g., 3–5 times) of their physical diameters.

Although absorption (as opposed to trapping) of the radiation is unnecessary to create the resonance effect, particles that do exhibit some intrinsic absorption show a dramatic increase at resonance wavelengths. Typically, the particles' intrinsic absorption would produce relatively small overall absorption at working concentrations. However, the optical-resonance phenomenon, based on self-reinforcing internal reflections, results in "absorption cross-sections" greater than unity in certain spectral regions; in other words, more radiation can be absorbed by the particle than actually falls geometrically on its maximum cross-sectional area. This is due to the wave nature of electromagnetic radiation and the propensity of the particle to "trap" certain frequencies of radiation, causing the radiation to travel back and forth within the particle until it is finally absorbed. The magnitude of the optical-resonance effect depends on the wavelength of incident radiation, the particle size, and the values of the real and imaginary components of the refractive index; particles that are large compared with the wavelength of incident radiation exhibit so many closely spaced (in terms of wavelength) resonances as to render selective absorption or scattering nearly impossible to control and use.

Optical resonance is enhanced by a high refractive index due to the resulting strong internal reflections, and also by a moderate intrinsic absorption level. Excessive absorption diminishes the resonance effect by immediately dissipating radiation as it enters the particle, while insufficient absorption causes incident radiation merely to undergo many reflections inside the particle; the radiation eventually leaves the particle without significant attenuation. The preferred class of optical-resonance materials discussed in the '249 application are "indirect" semiconductors. While useful in numerous applications, semiconductor particles must generally be present within a very narrow range of diameters (about ±10% from the mean) in order to exhibit good resonance characteristics; elaborate manufacturing techniques are typically required to achieve such tight size distributions.

Unfortunately, the high absorptions exhibited by metals ordinarily prevent any meaningful resonance effects of the type achieved with semiconductors. Moreoever, the refractive indices of metals generally feature real components, N, that are very low, indicating little or no capacity to trap radiation and resonate.

DESCRIPTION OF THE INVENTION

OBJECTS OF THE INVENTION

Accordingly, it is an object of the present invention to adapt metal particles to provide selective absorption within a defined segment of the electromagnetic spectrum.

It is another object of the invention to introduce into a carrier material metal particles having hypergeometric absorption cross-sections within a selectable, defined band of the electromagnetic spectrum.

It is still another object of the invention to confer selectable radiation-absorption properties to carrier materials without objectionable or excessive scattering of visible light.

Still another object of the invention is to create novel, highly durable radiation-absorptive materials for use in containers, packages, sheets, inks, paints, and decorative surface treatments exposed to harsh environments.

It is yet another object of the invention to provide color pigments that do not bleach as a result of exposure to sunlight.

Still a further object of the invention is to provide a method for efficiently manufacturing the metal particles of the present invention in a manner that facilitates precise control over chemical composition.

Other objects will, in part, be obvious and will, in part, appear hereinafter. The invention accordingly comprises compositions and articles of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

BRIEF SUMMARY OF THE INVENTION

Although the high absorption characteristics of metals generally are not conducive to resonance, we have found that, when dispersed within media having precisely complementary dielectric properties, certain metals can exhibit absorption cross-sections in excess of 1 in characteristic wavelength bands. The critical factors involve a negative value, in the wavelength band of interest, for the real component of the dielectric constant; and a certain relationship between the dielectric constants of the metal and the medium as more fully discussed below. Optical behavior of metal particles can be adequately predicted using the calculations set forth below and the more elaborate Mie calculations described in the '249 application. Conversely, these same calculations can be utilized to derive the parameters corresponding to desired absorption characteristics, enabling one to identify candidate particles for a particular application based on consistency with the derived parameters.

In practice, the particles are preferably manufactured as uniform nanosize spheres, and dispersed evenly within a suitable carrier material. However, unlike the semiconductor resonance particles described in the '294 application, the absorption characteristics of the present particles depend only somewhat on radius; accordingly, they need not be generated to conform to a precisely uniform size or to fit within a particularly narrow size distribution. The particles of the present invention can vary in radius by a factor of 2 or 3 and sometimes more, depending on the material and its application, so long as they remain small relative to the wavelengths to be absorbed.

The large absorption cross-sections ensure that a relatively small volume of particles will render the composite material fully opaque (or nearly so) to incident radiation of the resonance wavelength, blocking harmful radiation or producing pure colors. The durability of the particles themselves ensure resistance to mechanical wear forces and the bleaching effects of intense radiation (e.g., sunlight). The materials described herein also exhibit a high degree of chemical inertness.

BRIEF DESCRIPTION OF THE DRAWINGS

The foregoing discussion will be understood more readily from the following detailed description of the invention, when taken in conjunction with the accompanying drawings, in which.

BRIEF DESCRIPTION OF THE PREFERRED EMBODIMENTS

While the refractive indices of metals are real and positive, the real parts of their dielectric constants can be negative in the ultraviolet, optical, and infrared portions of the electromagnetic spectrum. This results from the oscillatory motion exhibited by free conduction electrons in a high frequency electric field. The motion of unbound electrons is 180° out of phase with the applied field, resulting in a negative electronic polarization. Since the polarization is proportional to $\epsilon_r-1$, where $\epsilon_r$ is the real component of the dielectric constant, it follows that $\epsilon_r$ must be smaller than 1 and may be negative. This reasoning is only approximate, however, due to interband electronic transitions involving non-s shell electrons (e.g., d-shell electrons in the case of Ti).

The dielectric constant $\epsilon$ is also the square of the refractive index, where $\epsilon=\epsilon_r+i\epsilon_i$ and the refractive index $N_1=N+iK$, so that $\epsilon_r+i\epsilon_i=N^2-K^2+2iNK$. Accordingly, $\epsilon_r$ is negative when $K>N$.

Although the magnitude of the electric field inside a dielectric sphere subjected to a uniform, external electric field is determined according to well-established principle, the actual calculations for conducting metal spheres at optical frequencies can prove cumbersome for conditions where the wavelength becomes comparable to the sphere radius. However, for the applications contemplated herein, the wavelength of incident radiation is much larger than the sphere radius. The sphere is therefore surrounded by an electric field that is approximately constant over the dimensions of the sphere, and thus the field inside the sphere may be approximated by the electrostatic formula $$E \approx \frac{3\epsilon_m}{\epsilon_r + 2\epsilon_m} E_0$$

where E is the field within the sphere, $E_0$ is the surrounding field, and $\epsilon_r$ and $\epsilon_m$ are the real components of the dieletric constants of the sphere and the medium, respectively. Accordingly, the field inside the sphere becomes very large (although not infinite, because the above equation does not include possible imaginary components) at the so-called Froelich Resonance when $\epsilon_r + 2\epsilon_m = 0$. When this condition is satisfied, the result is strong field enhancement and correspondingly large radiation absorption by the metal particle.

Provided the imaginary component of the particle's dielectric constant is small, its absorption cross-section is approximately given by $$C_{abs} = 12 \times \frac{\epsilon_m \epsilon_i}{(\epsilon_r + 2\epsilon_m)^2 + \epsilon_i^2}$$

in which the quantity $x = 2\pi N_{med} a/\lambda$, where $N_{med}$ is the refractive index of the surrounding medium, a is the radius of the particle sphere, and $\lambda$ is the vacuum wavelength of the incident radiation. Once again, the maximum absorption occurs when $\epsilon_r + 2\epsilon_m = 0$.

Figure 1:
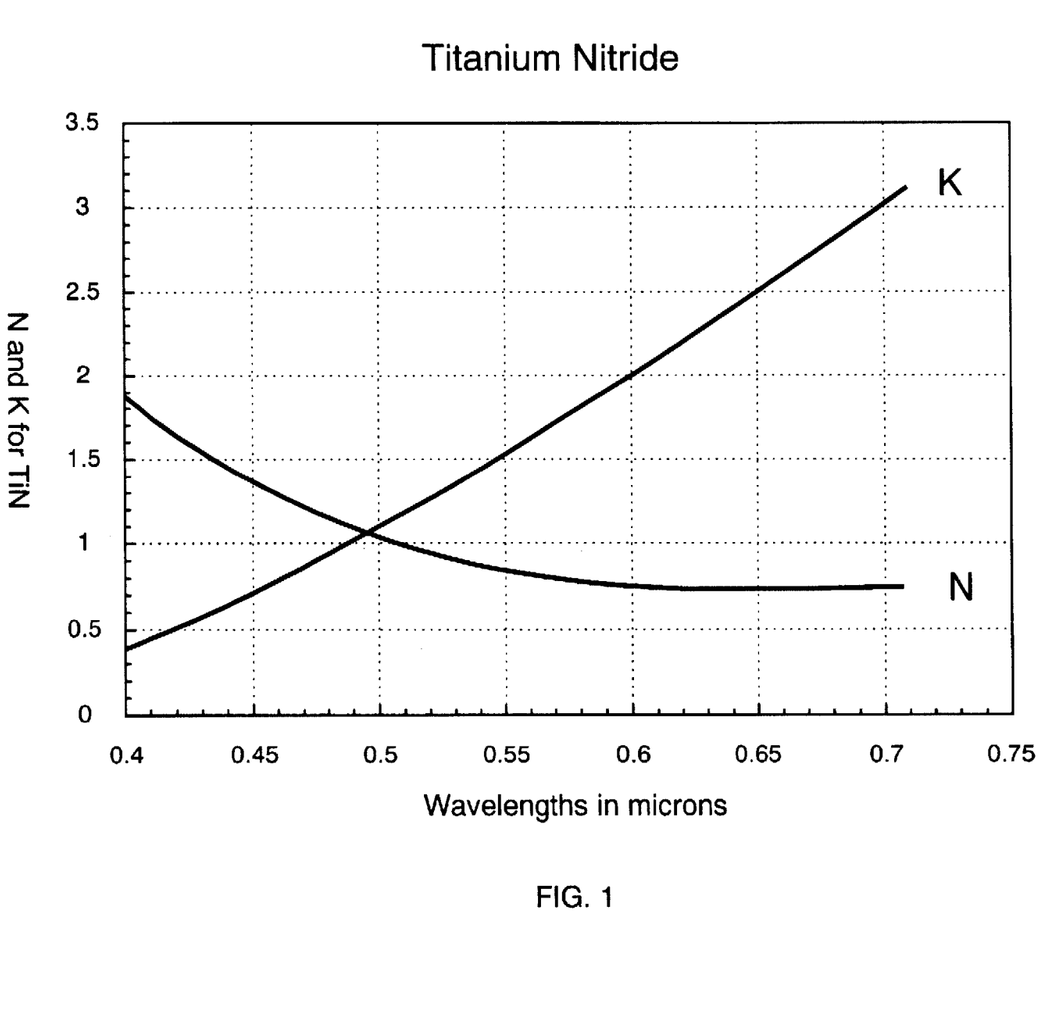
FIG. 1 is a plot of the variation, as a function of incident-radiation wavelength, in the real ($\epsilon'$) and imaginary ($\epsilon''$) components of the refractive index of titanium nitride (TiN)
Figure 2:
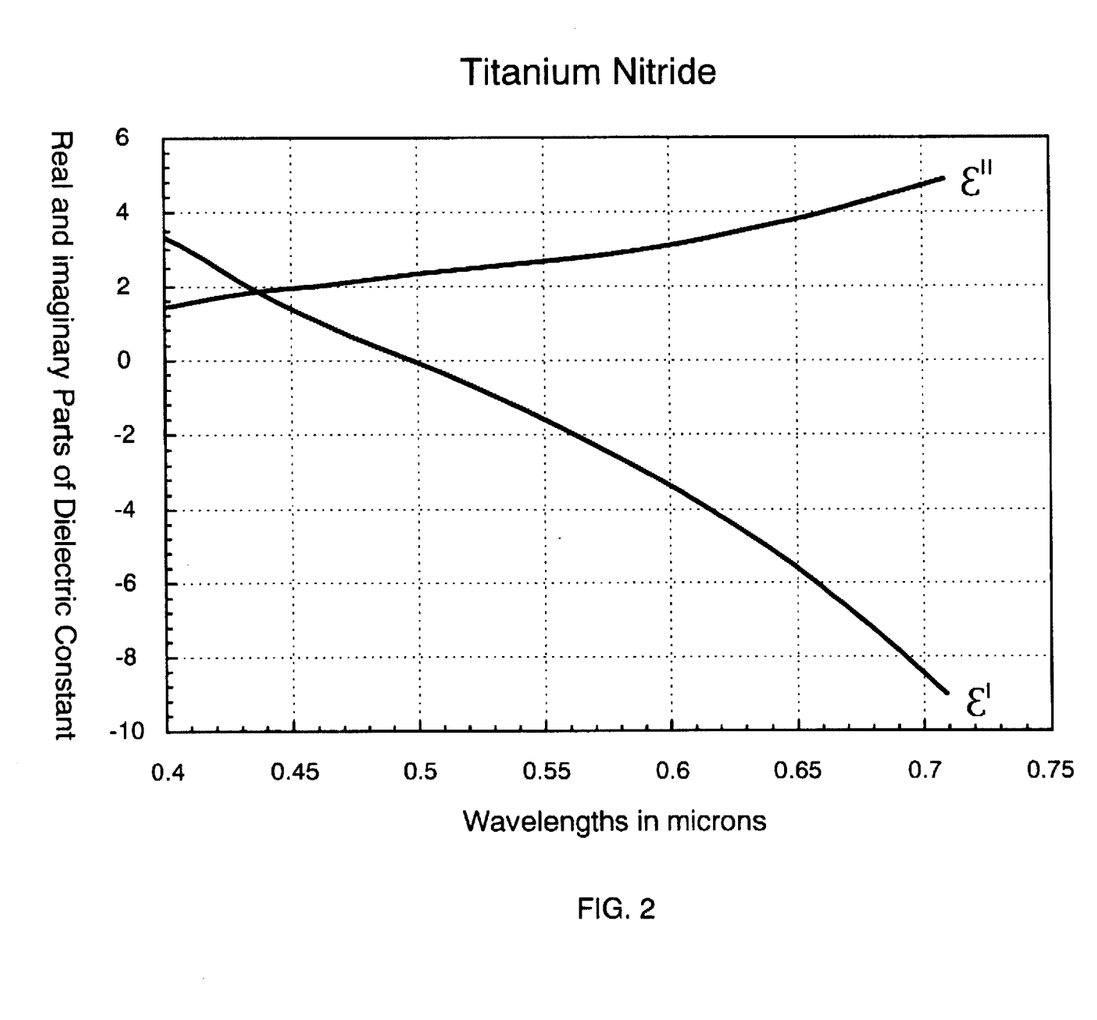
FIG. 2 replicates the depiction of FIG. 1 using a larger ordinate scale, and also plots the wavelength-dependent variation of the real and imaginary components of the dielectric constant for TiN.

TiN is a useful metal that absorbs strongly in the visible spectrum, with an absorption cross-section exceeding 1 for many wavelengths. FIG. 1 illustrates variation in the real and imaginary components of the refractive index of TiN over the visible spectrum. As discussed in the '249 application, high values of K prevent the emergence of strong resonances of the type described in connection with indirect bandgap semiconductors. FIG. 2 shows variation in the real and imaginary components of the dielectric constant for TiN, confirming strongly negative values for $\epsilon_r$ over much of the visible spectrum.

Using these data, it is possible to derive absorption cross-sections over the visible spectrum for variously sized TiN particles; the Mie calculations described in the '249 application can be used to calculate scattering cross-sections. These are plotted over the visible spectrum in FIG. 3. In the calculations a refractive index of 1.33 (corresponding to a dielectric constant of $1.33^2$), representative of water and a number of common materials, is ordinarily assumed for the surrounding carrier medium. Optimal particles for a given application exhibit peak absorption (with a cross-section greater than 1) at the spectral region of greatest interest, with minimal scattering of radiation. Scattering is often undesirable, imparting, in many cases, a milky appearance to particle-colored media, and can be minimized by utilizing very small particles. For example, particles with a radius of 0.02 µm show essentially no scattering at all.

Typical applications of radiation-absorptive particles involve their dispersion into a suitable carrier material. Typical carriers include glass, polyethylene (PE), polypropylene (PP), polyesters, polymethylmethacrylate (PMMA) and copolymers such as PMMA/PBMA (polybutylmethacrylate), PMMA/PS (polystyrene), or PBMA/PS. Because of the significant durability advantage associated with metal particles, the chosen carrier should be similarly durable. A uniform distribution of particles within the carrier is highly desirable in order to maximize the absorptive effect (that is, to assure isotropic absorption and to minimize the amount of particulate material that must be used).

As is clear from the formula defining $C_{abs}$, the dielectric constant of the carrier material also helps to determine the peak absorption wavelength, and one may vary the dielectric characteristics of the carrier in order to fine-tune that wavelength. This represents a departure from the approach of the '249 application, since the absorption wavelengths of semiconductor spheres are virtually unaffected by the dielectric constant of the surrounding medium.

The contribution of the carrier material to the peak absorption wavelength can be derived from the condition $\epsilon_r + 2\epsilon_m = 0$, and the approximate relationship between $\epsilon_r$ of the metal and the frequency of incident radiation:

$$\epsilon_r = 1 - \frac{v_p^2}{v^2}$$

where $v_p$ is the so-called plasma frequency (usually, although not always, located in the ultraviolet range), $v$ is the frequency of incident radiation, and $\epsilon_r$ is once again the real component of the dielectric constant of the metal particle. Substituting $c/\lambda$ for $v$, it can be shown that $$\frac{d\lambda}{d\epsilon_m} = \frac{\lambda}{2\epsilon_m + 1}$$

Figure 3:
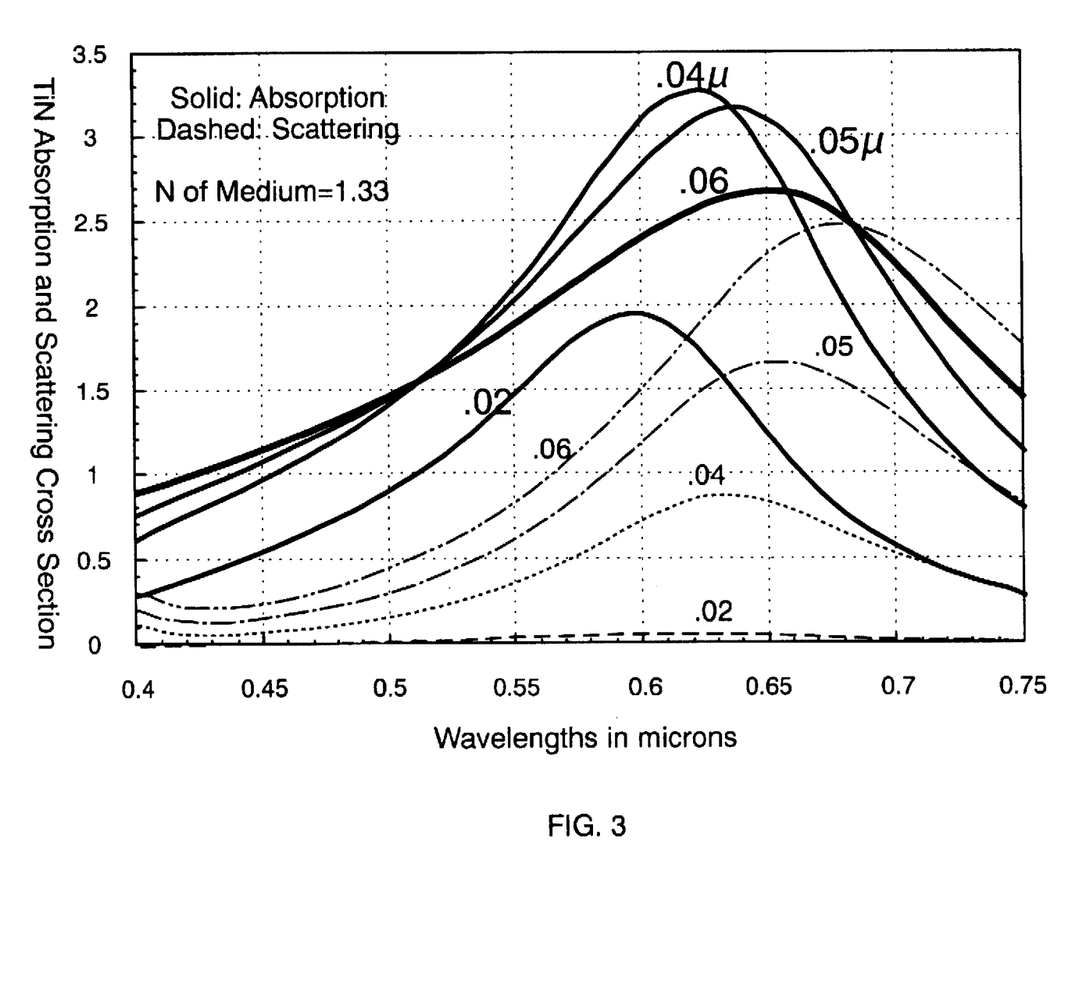
FIG. 3 graphically depicts variation, with respect to incident wavelength, of the absorption and scattering cross-sections for TiN spheres of various radii (in $\mu m$), with absorption plotted in solid lines and scattering plotted in dashed lines.
Figure 4:
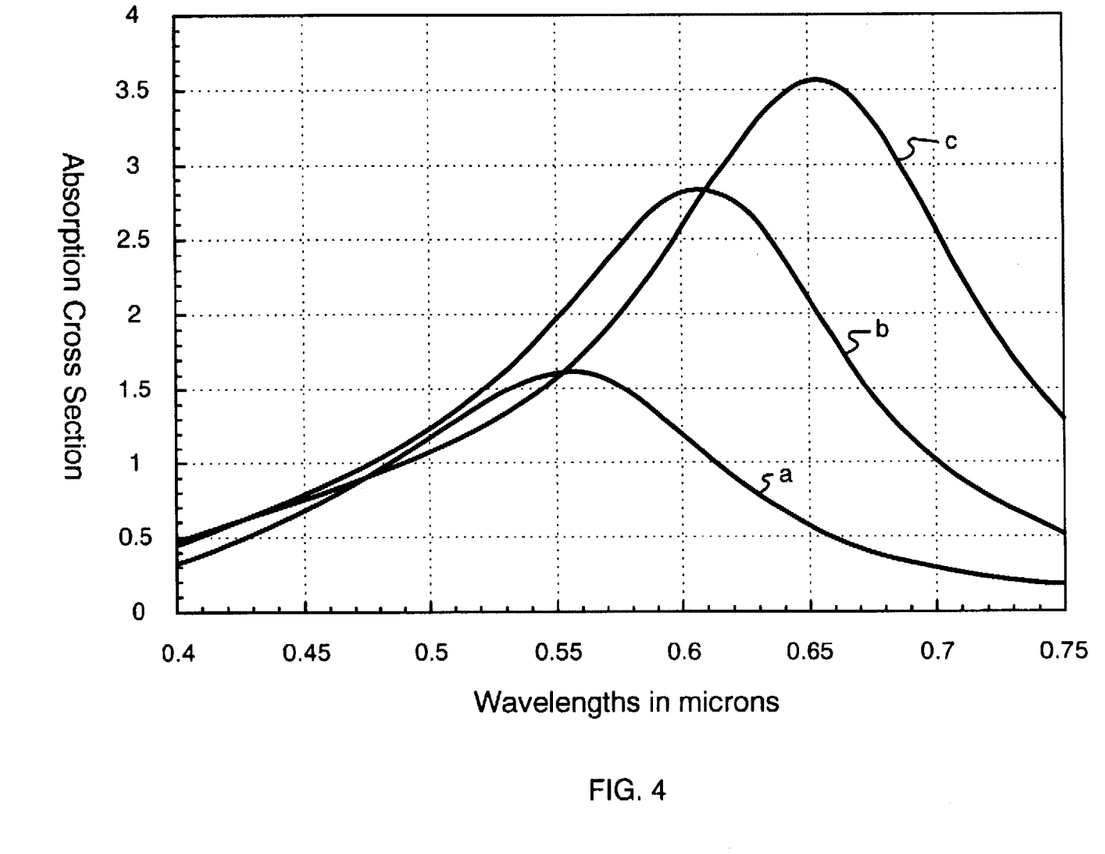
FIG. 4 graphically depicts variation, with respect to wavelength, of the absorption cross-sections for TiN spheres of radius 0.03 $\mu m$ in different media, illustrating the shift in the absorption peak produced by altering the refractive index of the medium.

Using the above expression in a Taylor series expansion up to the first order gives $$\Delta\lambda = \lambda_0 \frac{\Delta\epsilon_m}{2\epsilon_m + 1}$$

which provides an approximate sense of the change in peak absorption wavelength brought about by a change in the carrier dielectric constant. For example, as shown in FIG. 3, the maximum absorption of TiN particles of radius 0.02 µm occurs at about 6000 Å. For $\epsilon_m = 1.77$, an increase of 0.25 in the carrier's dielectric constant results in a shift of about 330 Å to 6500 Å; a similar shift can be achieved by increasing the particle size. FIG. 4, generated using the Mie calculations, more directly and accurately illustrates variation of the absorption peak with the refractive index of the medium. In curve a, the real refractive-index component N=1.0 (so that $\epsilon_m = 1.0$); in curve b, N=1.33 and $\epsilon_m = 1.77$; and in curve c, N=1.6 and $\epsilon_m = 2.56$.

For most metals, the condition $\epsilon_r + 2\epsilon_m = 0$ occurs outside the visible region. However, colloidal gold particles often exhibit a reddish coloration, and TiN, while golden in the metallic state, appears blue in colloidal suspension due to absorption in the red spectral region (as depicted in FIG. 3). To obtain different colors, one can incrementally is alter the composition of TiN particles by alloying with carbon, thereby shifting the peak absorption toward longer wavelengths.

Figure 5:
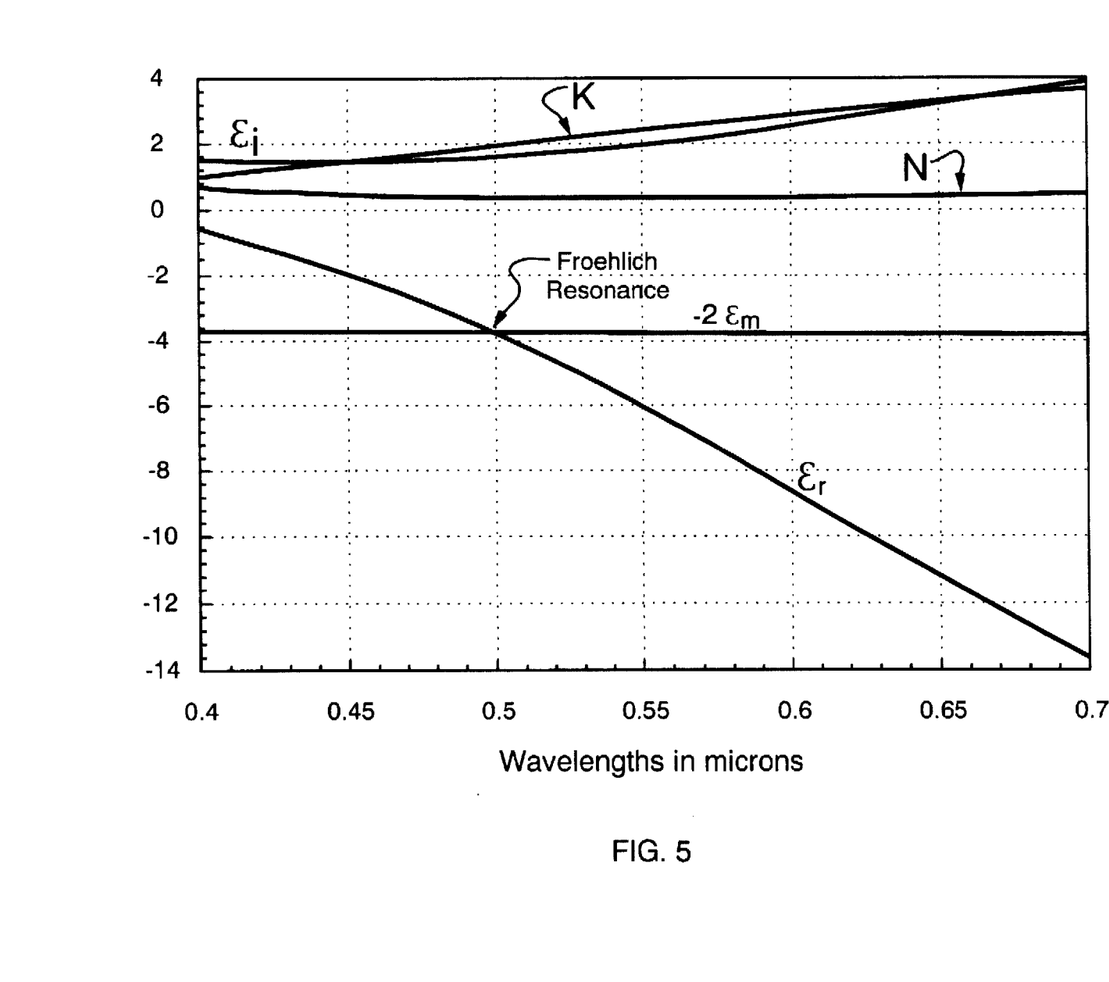
FIG. 5 is a plot of the variation, as a function of incident-radiation wavelength, in various optical parameters of zirconium nitride (ZrN)
Figure 6:
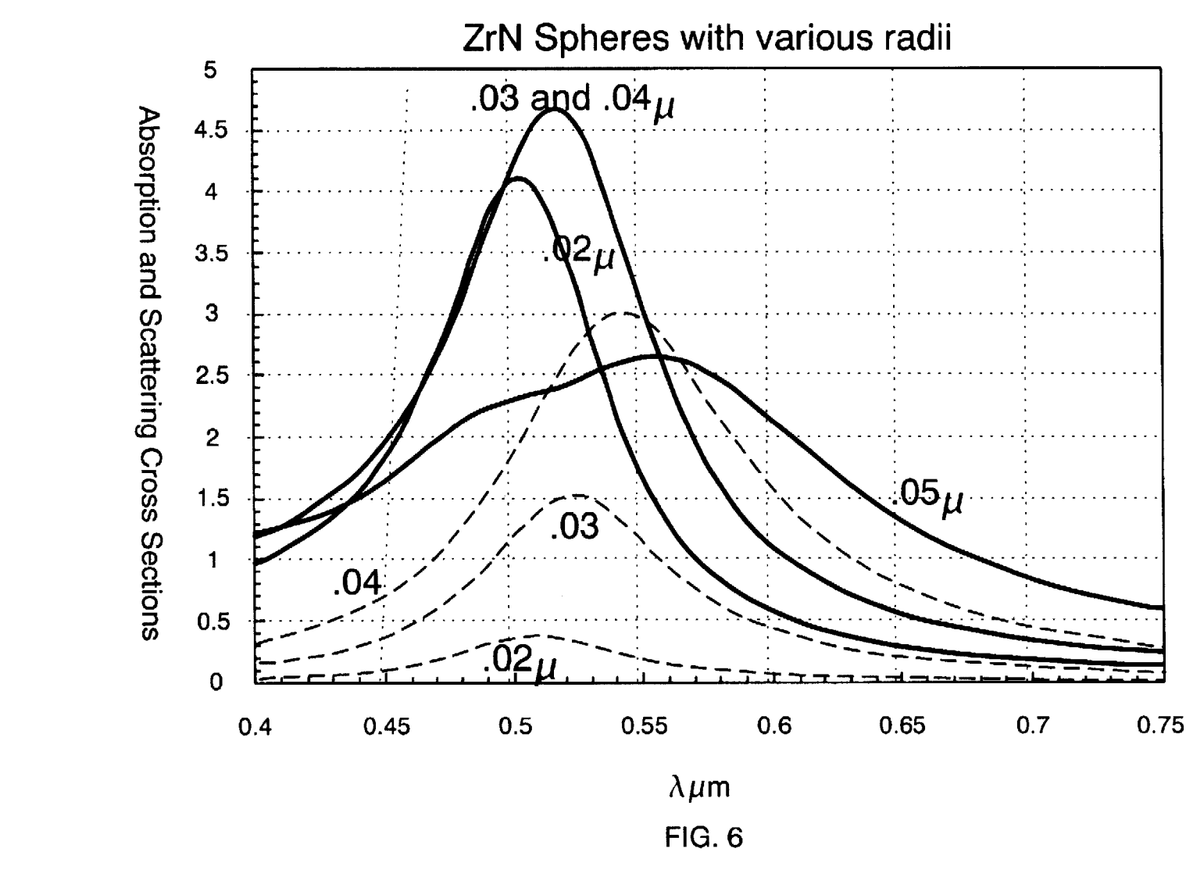
FIG. 6 graphically depicts variation, with respect to incident wavelength, of the absorption and scattering cross-sections for ZrN spheres of various radii (in $\mu m$), with absorption plotted in solid lines and scattering plotted in dashed lines.
Figure 7:
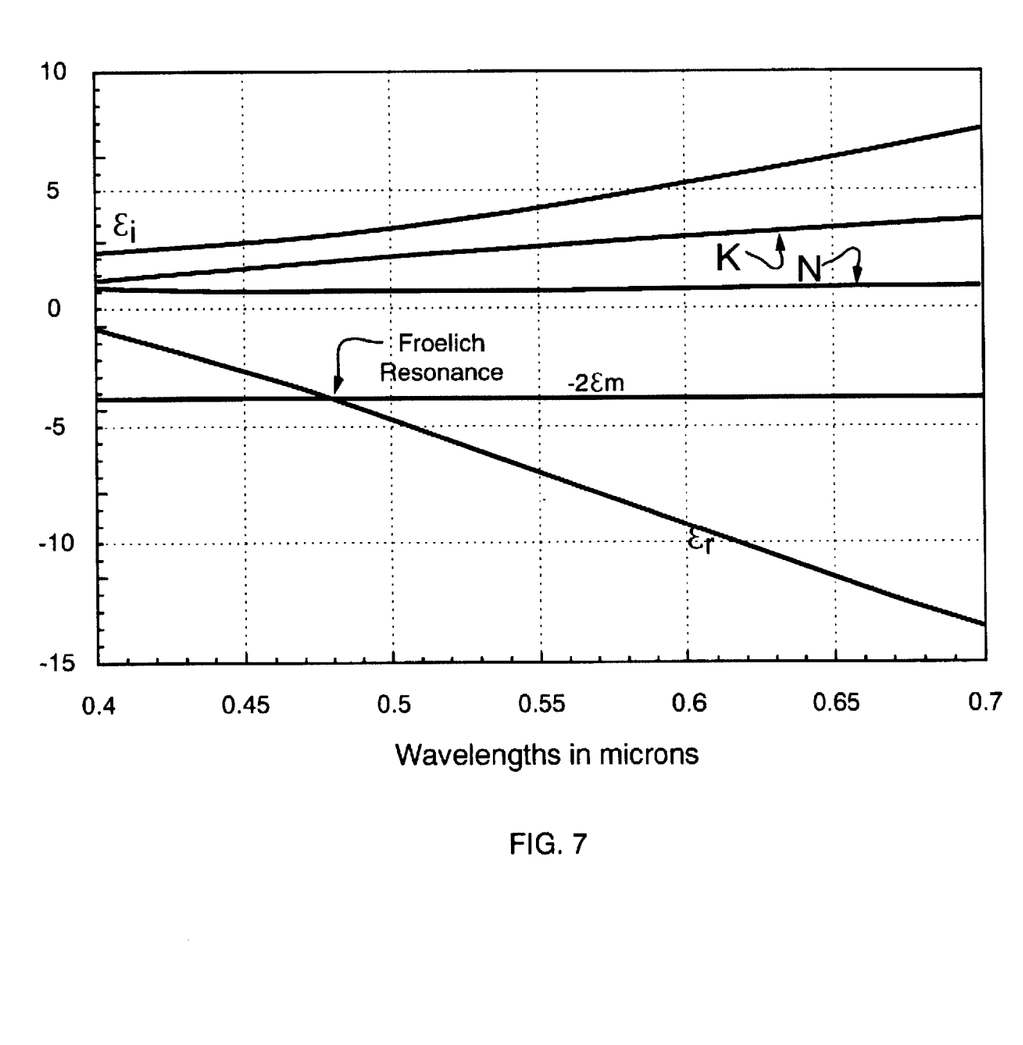
FIG. 7 is a plot of the variation, as a function of incident-radiation wavelength, in various optical parameters of halfnium nitride (HfN)
Figure 8:
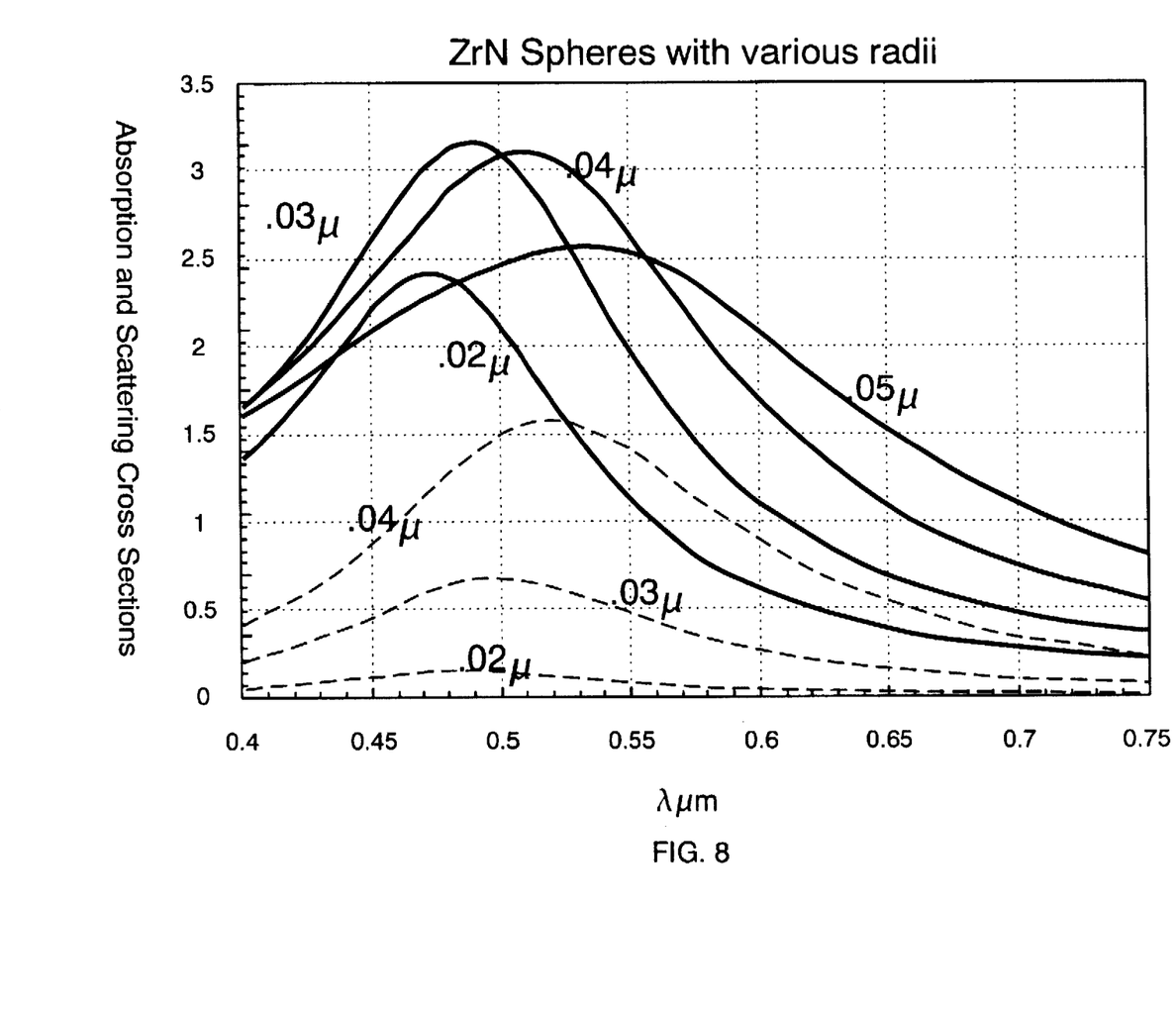
FIG. 8 graphically depicts variation, with respect to incident wavelength, of the absorption and scattering cross-sections for HfN spheres of various radii (in $\mu m$), with absorption plotted in solid lines and scattering plotted in dashed lines.

A variety of hard metallic compounds or compounds exhibiting metallic conduction exhibit coloration similar to that of bulk TiN, and therefore prove useful as coloring agents in the visible region. These include ZrN, HfN, TiC$_x$N$_{1-x}$ (with values of x between 0 and 0.5), ZrC$_x$N$_{1-x}$ (with values of x between 0 and 0.2), Ti$_x$Al$_{1-x}$N (with values of x ranging from 0.1 and 0.7) and Ti$_x$Zr$_{1-x}$N (with values of x ranging from 0.2 to 0.8). (The foregoing formula ranges are not necessarily exclusive; variations outside these ranges may prove useful as well.) FIG. 5 illustrates variation in the relevant optical parameters of ZrN with incident wavelength. As indicated in the figure, the Froelich Resonance occurs at a wavelength of about 5000 Å. As shown in FIG. 6, the maximum absorption cross-section of small ZrN particles does indeed occur near this wavelength. ZrN therefore performs similarly to TiN, but with the absorption shifted to shorter wavelengths and exhibiting sharper, more desirable absorption peaks. FIGS. 7 and 8 illustrate corresponding characteristics of small HfN particles, which exhibit peak absorptions shifted even further toward the blue.

Other suitable metals can be identified by reference to published values for the real and imaginary components of refractive index or dielectric constant.

The metal particles of the present invention can be generated in a variety of ways well-known to those skilled in the art. At present, the best methods involve controlled gas-phase reactions. Appropriate gas-phase combination of TiCl$_3$ and ammonia, for example, produces TiN. Other metal chlorides can also be reacted with ammonia to produce the metal nitrides mentioned above. Carbon can be introduced into the gas-phase reaction vessel in the form of methane for alloying purposes.

Figure 9:
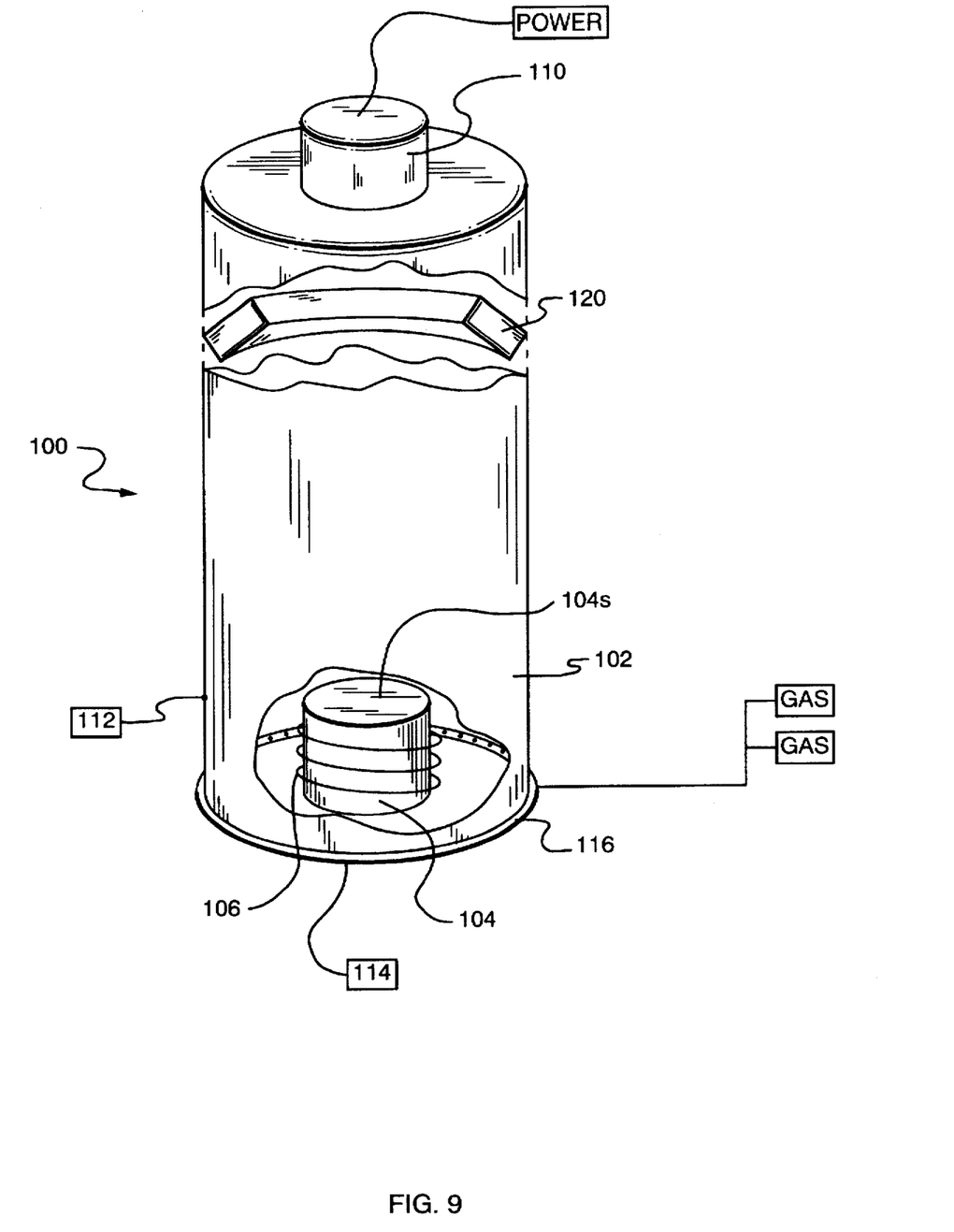
FIG. 9 schematically illustrates an apparatus for producing uniformly sized particles in accordance with the present invention.

Refer now to FIG. 9, which illustrates a preferred reactor configuration indicated generally by reference numeral 100. The reactor includes a vacuum vessel 102 that contains a preheated supply rod 104, whose surface is additionally heated as described below to cause the formation of a vapor from which particles are derived. Supply rod 104 is maintained at a temperature close to its melting point by an inductive heating coil 106. An electron beam source 110, whose output is oriented toward the surface 104s of pool 104 and whose beam output is substantially coincident with the contour of surface 104s, evaporates the hot material into a vapor. To ensure that these having largely equal diameters, surface 104s is subjected to the vibration output of an ultrasound source 112. Source 112 produces, for example, a transverse acoustic wave across surface 104s. Alternatively, one can employ an ultrasound source 114, which generates a vertical ultrasound wave directed axially through supply rod 104. The respective intensities and frequencies of source 112 or 114 are adjusted so as to cause the separation from surface 104s of myriad vapor droplets having a predetermined specific, uniform size.

An inert gas (such as argon) is injected at low pressure (typically about 0.001 torr) into vessel 102 through a ring inlet 116. The inert gas sweeps the cloud of vapor droplets toward the entrance of a cryogenic pump whose chamber 120 receives both the inert gas and the solidified vapor droplets. The gas is released from a level at or below surface 104s to ensure entrainment of all generated vapor droplets. In transit to receptor 120 the droplets solidify, and in chamber 120 are frozen into a cryogenically cooled mixture of particles and inert gas. The particles are subsequently recovered from chamber 120 as a finely dispersed powder.

If desired, a reactant dopant gas can be introduced along with the inert gas to form electronegative species on the surface of the droplets during transit. Use of oxygen, for example, results in formation of oxides of the base material and attachment of atomic oxygen to the surface, the extent of reaction—i.e., the proportion of the droplet surface covered by oxygen and oxide derivatives—depends on the amount of oxygen gas introduced and the duration of droplet transit. In any case, all vapor droplets pass through the flood of electrons emitted by electron beam source 110, and thereby acquire an electrostatic potential that repels the particles from one another during their transit to chamber 120. This electrostatic charge is generally retained by the particles after they are collected from chamber 120. If desired, electronegative gas species other than oxygen, such as fluorine, can also be used advantageously.

The degree of charge imparted to the particles is preferably sufficient to confer a repulsive force among particles that exceeds their average thermokinetic energy, thereby creating effective resistance to collision and coalescence. As a further means of reducing reagglomeration, the internal geometry and operating parameters of vessel 102 can be maintained such that the distance the droplets travel before resolidifying remains below the mean free path. Ensuring the persistence of this condition requires a relatively large mean free path, which can be established by high-vacuum conditions, and rapid heat dissipation with distance from surface 104s.

It will therefore be seen that the foregoing represents a highly advantageous approach to the production of metal particles having selected optical properties, and which may be employed in a variety of products that require finely selectable radiation-transmission and blocking properties. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An electromagnetic radiation-absorptive material for absorbing selected radiation within a predetermined spectral band, the material comprising:
   a. a carrier material having a dielectric constant; and
   b. dispersed therein, a particulate metal or metallic compound exhibiting a Froelich Resonance producing an absorption cross-section greater than 1 in the predetermined spectral band when dispersed in the carrier.

2. The material of claim 1 wherein the particulate metal or metallic compound and the carrier each have a dielectric constant comprising a real component and, at a wavelength within the predetermined spectral band, the sum of (i) the real component of the dielectric constant of the particulate metal or metallic compound and (ii) twice the real component of the dielectric constant of the carrier is approximately equal to zero.

3. The material of claim 1 wherein the particulate metal or metallic compound consists of spheres, the spheres having a radius that is small relative to wavelengths within the predetermined spectral band.

4. The material of claim 3 wherein the spheres have radii that deviate by a factor of at least 2 from a mean radius.

5. The material of claim 1 wherein the particulate metal or metallic compound is present in sufficient volumetric density to substantially block passage of the selected radiation.

6. The material of claim 1 wherein the particulate compound is selected from the group consisting of TiN, ZrN, HfN, TiC$_x$N$_{1-x}$ (where 0<x<1), ZrC$_x$N$_{1-x}$ (where 0<x<1), Ti$_x$Al$_{1-x}$N (where 0<x<1), and Ti$_x$Zr$_{1-x}$N (where 0<x<1).

7. The material of claim 1 wherein the particulate compound is TiN spheres, the spheres having a radius that is small relative to wavelengths within the predetermined spectral band.

8. The material of claim 7 wherein the spheres have substantially identical radii in the range 0.2–0.6 μm.

9. The material of claim 1 wherein the particulate compound is ZrN spheres, the spheres having a radius that is small relative to wavelengths within the predetermined spectral band.

10. The material of claim 1 wherein the particulate compound is HfN spheres, the spheres having a radius that is small relative to wavelengths within the predetermined spectral band.

11. The material of claim 1 wherein the carrier material is selected from the group consisting of glass, polyethylene, polypropylene, polyester, polymethylmethacrylate and copolymers thereof, and polybutylmethacrylate and copolymers thereof.

* * * * *